May 13, 1930.  S. W. GORDON  1,758,717
LATHE CENTER
Filed May 10, 1928
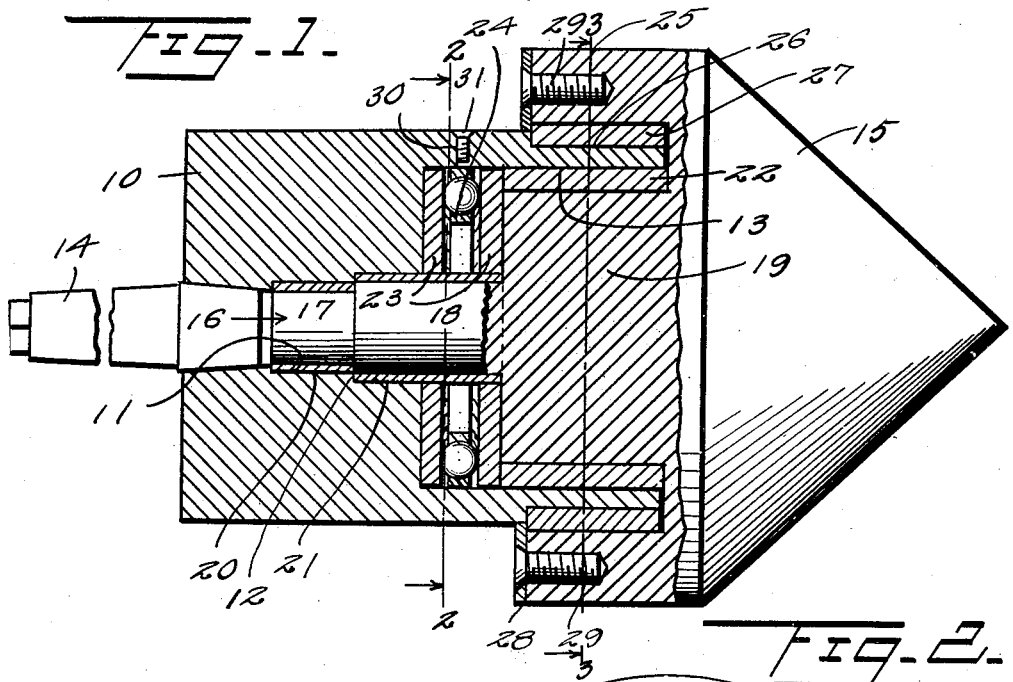
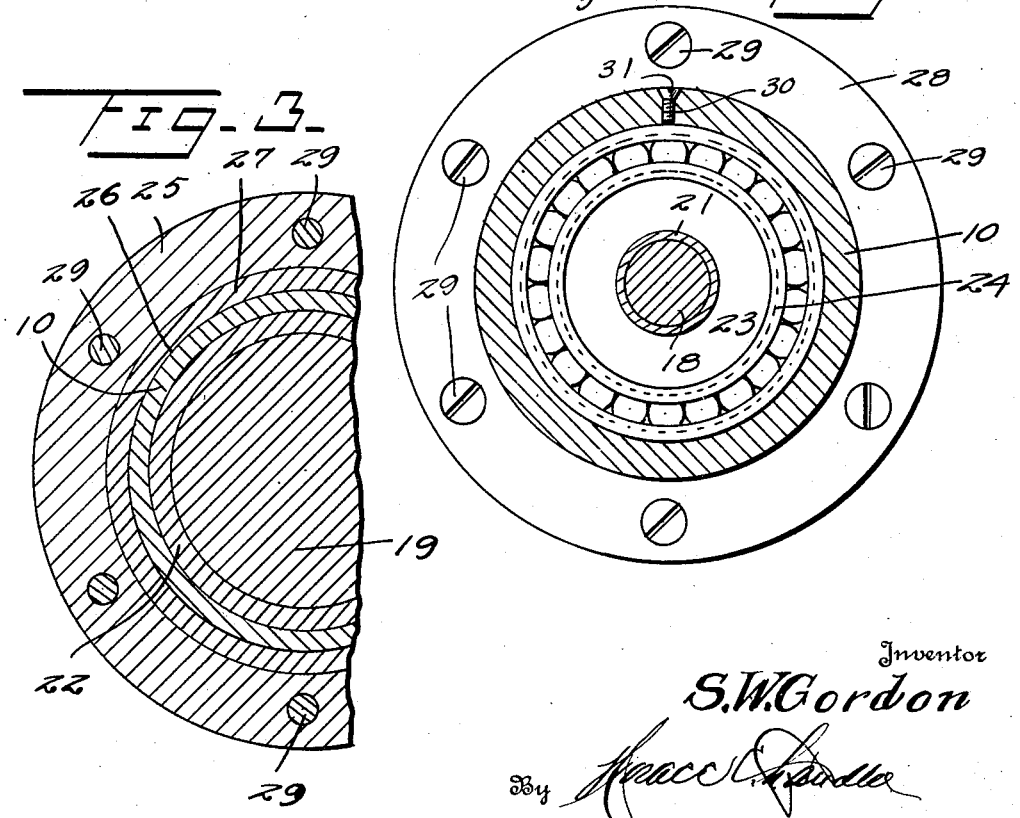
Inventor
S. W. Gordon
By
Attorney Patented May 13, 1930

1,758,717

UNITED STATES PATENT OFFICE

SAMUEL W. GORDON, OF CANAL FULTON, OHIO

LATHE CENTER

Application filed May 10, 1928. Serial No. 276,729.

This invention relates to new and useful improvements in centers, and particularly to centers for turning machines such as lathes, and the like.

One object of the invention is to provide a center which is simple in construction, durable and effective in its operation, and one which can be manufactured at a comparatively low cost.

Another object is to provide a center of this character which may be readily taken apart for cleaning and repairs, and which is properly supplied with lubricant.

Other objects and advantages will be apparent from the following description when taken in connection with the accompanying drawing.

In the drawing:

Figure 1 is a fragmentary vertical longitudinal central sectional view through a lathe center, made in accordance with the present invention.

Figure 2 is a vertical transverse sectional view on the line 2—2 of Figure 1.

Figure 3 is a fragmentary vertical transverse sectional view on the line 3—3 of Figure 1.

Referring particularly to the accompanying drawing, 10 represents an approximately cylindrical body portion, in which is formed the longitudinal central bore 11, said bore having two portions of different diameters separated by the shoulder 12, and the large recess 13, in one end, communicating with one end of said bore. The other end of the bore is slightly tapered to receive the tapered end of the supporting member 14, which is adapted to be received in the tail-stock of a lathe, not shown.

The rotatable portion of the center comprises an approximately conical member 15, having a stem 16, on its inner end, said stem including portions 17, 18, and 19, which are disposed within the portions of the bore 11, and in the recess 13, respectively. Surrounding the portions 17 and 18, of the stem 16, are the bronze bushings 20 and 21, respectively, while a larger bronze bushing 22 encircles the portion 19, within the recess 13. Between the end face of the portion 19, and the inner or bottom wall of the recess 13, are disposed the thrust washers 23, and the ball retainer 24, the latter being arranged intermediate said washers. The same end face of the portion 19, and the inner end of the bushing 22 bear against the outer of the said washers, as is clearly seen in Figure 1. Formed on the inner end of the conical head 15, outwardly of the portion 19, is a circular flange 25, said flange being slightly shorter than the portion 19, and immovably disposed in a circumferential recess or rabbet 26, in the outer face of the surrounding wall of the recess 13, is a bushing 27. The bushing 27 is slightly thicker than the depth of the rabbet whereby a portion of the bushing projects from said rabbet. A flat retaining ring 28 is disposed against the end face of the flange 25, and is secured thereto by means of the screws 29. This ring also bears against the projecting portion of the inner end of the bushing 27, whereby to effectively prevent accidental displacement of the head 15 from the body of the device. Formed through the flange or outer wall of the recess 13, is an oil hole 30, closed by a screw 31, which permits introduction of lubricant to the roller bearings within the recess.

By removing the screws 29, the ring 28 may be removed, thus releasing the head 15, which may then be easily withdrawn from the body.

What is claimed is:

A center including a body having a bore formed with a recess at one end, a head having a stem disposed in the bore and having an enlarged portion fitting in the recess, the outer face of the wall of the recess being formed with a rabbet, a bushing encircling the said enlarged portion within the recess, a bushing in said rabbet and partly projecting therefrom, a rearwardly extending flange on the head embracing said last-named bushing, and a retaining ring carried by the end face of the flange of said head and bearing against the rear end of the projecting portion of the last-named bushing.

In testimony whereof, I affix my signature.

SAMUEL W. GORDON.